(12) United States Patent
Thompson et al.

(10) Patent No.: US 12,728,722 B2
(45) Date of Patent: Sep. 8, 2026

(54) SYSTEMS AND METHODS FOR MOVING A VEHICLE USING EXTERNALLY MOUNTED HMI

(71) Applicant: FORD GLOBAL TECHNOLOGIES, LLC, Dearborn, MI (US)

(72) Inventors: Scott Steadmon Thompson, Belleville, MI (US); John Eric Rollinger, Troy, MI (US); Pietro Buttolo, Dearborn Heights, MI (US); Douglas Raymond Martin, Canton, MI (US); David Hancock, South Rockwood, MI (US); Matthew Ryan Preston, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 459 days.

(21) Appl. No.: 18/340,247

(22) Filed: Jun. 23, 2023

(65) Prior Publication Data

US 2024/0424894 A1 Dec. 26, 2024

(51) Int. Cl.
*B60K 26/02* (2006.01)
*B60T 7/08* (2006.01)

(52) U.S. Cl.
CPC .............. *B60K 26/02* (2013.01); *B60T 7/085* (2013.01)

(58) Field of Classification Search
CPC ........ B60K 26/02; B60K 35/10; B60R 16/02; B60T 1/065; B60T 7/085; B60T 7/16; B62D 33/0273; G05B 19/4155; G05B 2219/34231
See application file for complete search history.

(56) References Cited

U.S. PATENT DOCUMENTS

| | | | | |
|---|---|---|---|---|
| 5,439,253 A * | 8/1995 | Trubiano | ............. | A47D 15/006 280/33.993 |
| 9,352,729 B2 | 5/2016 | Choi | | |
| 10,494,024 B2 | 12/2019 | Urhahne | | |
| 2006/0096799 A1* | 5/2006 | Tatsuno | ................ | F02D 31/001 180/305 |
| 2007/0213907 A1* | 9/2007 | Shimizu | ................ | F16H 63/483 701/113 |

(Continued)

FOREIGN PATENT DOCUMENTS

| | | | |
|---|---|---|---|
| EP | 3401179 A1 | 11/2018 | |
| GB | 2562836 A * | 11/2018 | .............. B62D 1/00 |
| KR | 19980083920 A | 12/1998 | |

OTHER PUBLICATIONS

Machine Translation of GB 2562836 A obtained from Clarivate Analytics on Sep. 3, 2025 (Year: 2018).*

*Primary Examiner* — Fadey S. Jabr
*Assistant Examiner* — Michael J Herrera
(74) *Attorney, Agent, or Firm* — Vincent Mastrogiacomo; Brooks Kushman P.C.

(57) ABSTRACT

A vehicle includes a powerplant and a body. The body defines a passenger cabin and a box and having a tailgate mounted to the box. A step assembly is associated with the box and includes a step and a handle. The handle has a sensor configured to receive input from a user located outside of the passenger cabin and output a signal when the input is active. A controller is programmed to, in response to the signal being received, command a torque to the powerplant to propel the vehicle based on the signal.

14 Claims, 4 Drawing Sheets

(56) References Cited

U.S. PATENT DOCUMENTS

| | | | | |
|---|---|---|---|---|
| 2013/0282218 | A1* | 10/2013 | Matsuda | B60L 15/2045 701/22 |
| 2019/0054927 | A1* | 2/2019 | Hayakawa | G08G 1/14 |
| 2020/0109588 | A1* | 4/2020 | Nania | E05F 15/40 |
| 2020/0262460 | A1* | 8/2020 | Kim | B62B 5/0073 |
| 2021/0024057 | A1* | 1/2021 | Ding | B60W 30/18072 |
| 2022/0097700 | A1* | 3/2022 | Semenov | B60W 50/085 |

* cited by examiner 10
46
12
24
59
14
28
18
26
54
52
70
50
58

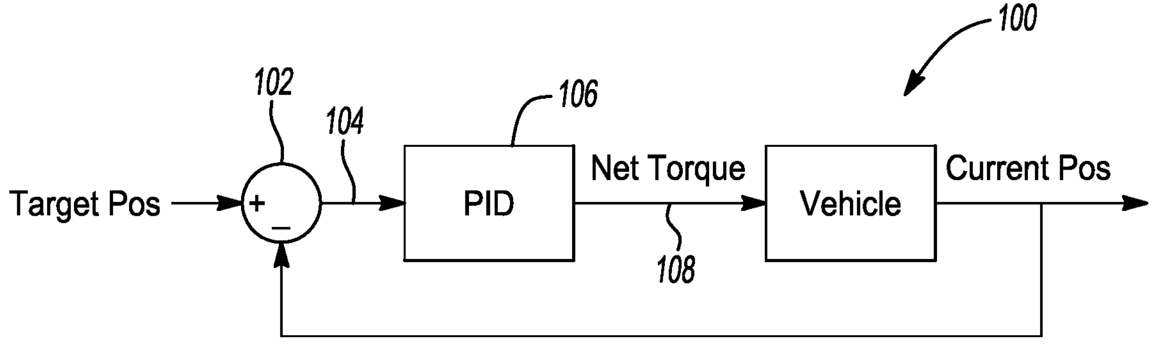
Fig-6
120
122
124
126
Target Speed
+
_
PID
Net Torque
Vehicle
Current Speed
128
Fig-7
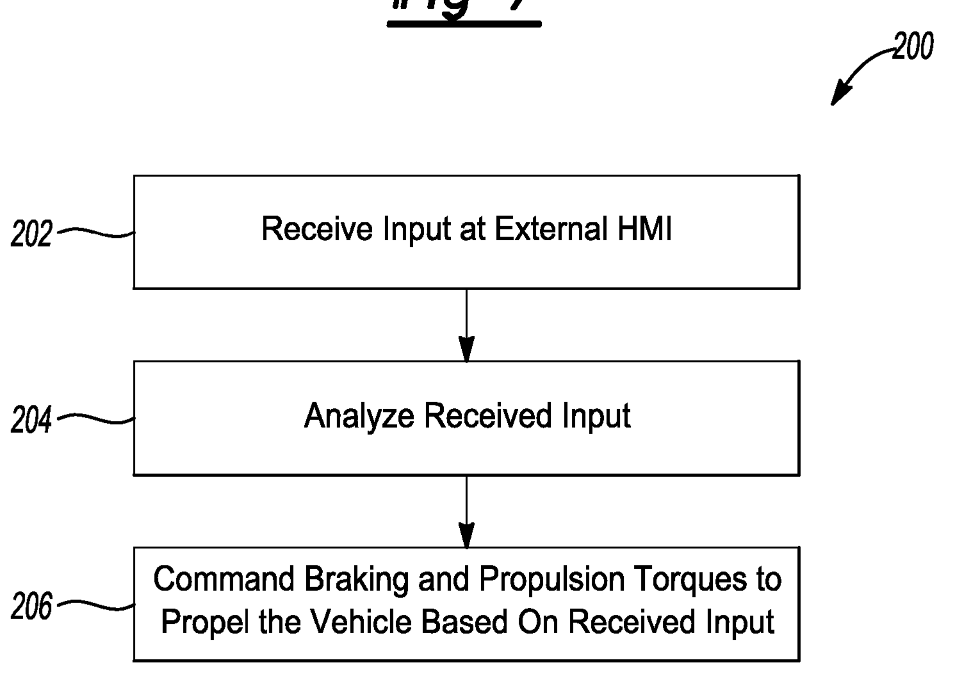
Fig-8

SYSTEMS AND METHODS FOR MOVING A VEHICLE USING EXTERNALLY MOUNTED HMI

TECHNICAL FIELD

This disclosure relates to vehicles and more particularly to enabling a user to move a vehicle while located outside of the vehicle.

BACKGROUND

Vehicles, such as pickup trucks, may include a passenger cabin and a box located behind the cabin. The cabin and box are parts of a vehicle body and are supported by a frame. The box has a bed, opposing sidewalls, a headboard and a tailgate. The box may be equipped with toolboxes, ladder racks, tie-downs and other equipment. Pickup trucks are frequently used as work vehicles in industries such as construction, landscaping, snow plowing, and transportation.

SUMMARY

According to one embodiment, a vehicle includes a powerplant and a body. The body defines a passenger cabin and a box and having a tailgate mounted to the box. A step assembly is associated with the box and includes a step and a handle. The handle has a sensor configured to receive input from a user located outside of the passenger cabin and output a signal when the input is active. A controller is programmed to, in response to the signal being received, command a torque to the powerplant to propel the vehicle based on the signal.

According to another embodiment, a vehicle includes a passenger cabin, a powerplant, and a sensor located externally to the passenger compartment allowing a user to control vehicle movement from outside of the vehicle. The sensor is configured to measure an input by the user and output a signal. A controller is programmed to, when the signal exceeds a threshold, command a torque to the powerplant to propel the vehicle according to the signal.

According to yet another embodiment, a method of propelling a vehicle by a person outside of the vehicle includes receiving a propulsion request from a human machine interface (HMI) located on an exterior of the vehicle; and, in response to the propulsion request being received, commanding a torque to a powerplant of the vehicle such that the vehicle is propelled according to commands from a person who is located outside of the vehicle.

BRIEF DESCRIPTION OF THE DRAWINGS

FIG. 6 is a closed-loop controller for controlling propulsion of the vehicle based a target vehicle position.

FIG. 7 is a closed-loop controller for controlling propulsion of the vehicle based a target vehicle speed.

FIG. 8 is a flow chart of an algorithm for controlling the vehicle during the external driving mode.

DETAILED DESCRIPTION

Figure 1:
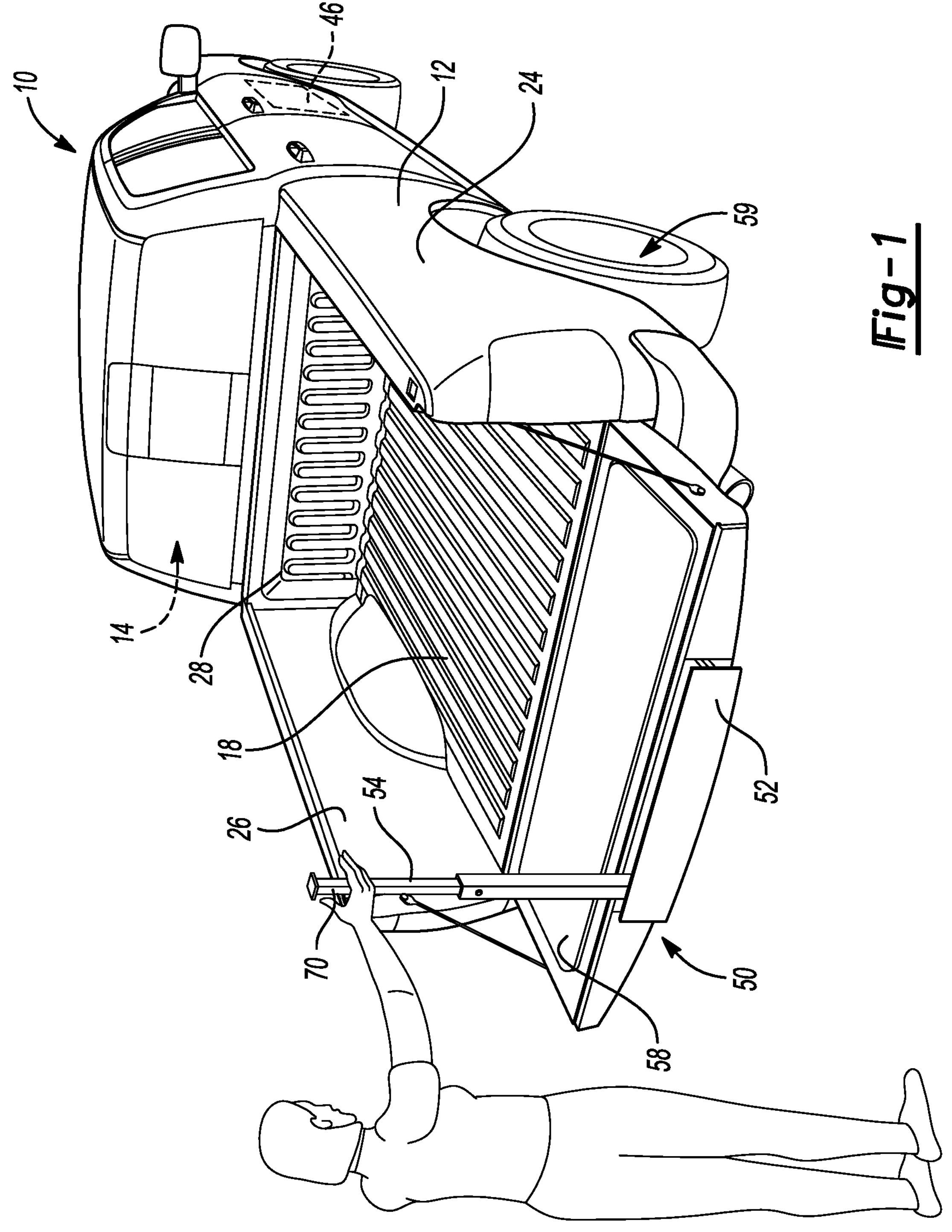
FIG. 1 is a rear perspective view of a vehicle being propelled by a user standing outside of the vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A pickup truck 10 includes a frame having a first longitudinal frame rail and a second longitudinal frame rail. The pickup truck 10 also includes a box 12 that is supported by the first and second frame rails. A passenger cabin (cab) 14 is placed in front of the box 12 and includes the traditional controls for driving the vehicle e.g., steering wheel, pedals, etc. The box 12 may include a bed 18 having lateral support structures that are attached to the first frame rail and the second frame rail at a lower surface of the lateral support structures.

The box 16 also includes a first sidewall 24 attached along a first longitudinal side of the bed 18 and a second sidewall 26 attached along a second longitudinal side of the bed 18. A headboard 28 is connected between the first and second sidewalls 24, 26 at a front portion of the box 16 near the cab. The first sidewall includes a top surface, an inner wall, and an outer wall. The second sidewall 26 includes a top surface, an inner wall and an outer wall.

The truck 10 also includes a tailgate 58 that is pivotally attached to a rear end of the box 16 between the first sidewall 24 and the second sidewall 26. The tailgate 58 includes a pair of opposing sides that may each include a lower pin. Each lower pin may be received in a corresponding sleeve. The tailgate 58 pivots between an open position and a closed position along the lower pins and sleeves. Each tailgate sidewall may also include a latch disposed at an upper portion of the sidewall. The latch may cooperate with a corresponding locking. The latch and the locking post may engage each other to secure the tailgate 58 in the closed position. The tailgate 58 also includes a handle that may cooperate with the latches to disengage the latches from the locking posts so that the tailgate 58 can be opened.

The vehicle 10 may include friction brakes 59 for slowing the vehicle. The friction brakes 59 may be part of a hydraulic braking system that is controlled by a brake pedal located within the passenger cabin 14. A friction brake may be located at each wheel of the vehicle and may include a brake disc rotational fixed of the wheel and a caliper fixed to a non-rotating component of the vehicle suspension system. The caliper is configured to clamp the brake disc between two brake pads in order to slow the vehicle once hydraulic fluid pressure is sent to that brake.

The vehicle may include a step system 50 that includes a footstep 52 and a step handle 54. The step handle 54 may be provided on the tailgate 58. The handle 54 may include a stowed position and a deployed position (shown). The handle 54 provides a grab for a person using the footstep 52.

The powertrain of the vehicle may be a conventional including an internal combustion engine (one example of a powerplant) and a transmission, a fully electric including one or more electric machines (another example of a powerplant) for driving one or more axles, or a hybrid that includes an internal combustion engine and an electric machine for propelling the vehicle.

The vehicle 10 includes a controller 46 such as a powertrain control unit (PCU), an engine control module (ECM), and a motor control unit (MCU), or the like. While illustrated as one controller, the controller 46 may be part of a larger control system and may be controlled by various other controllers throughout the vehicle 10, such as a vehicle system controller (VSC). It should therefore be understood that the controller 46 and one or more other controllers can collectively be referred to as a "controller" that controls various actuators in response to signals from various sensors to control functions such as starting/stopping an engine, commanding an engine torque, operating an electric machine to provide wheel torque or a charge battery, select or schedule transmission shifts, etc. Controller 46 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller 46 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 46 within each of the subsystems identified above. Representative examples of parameters, systems, and/or components that may be directly or indirectly actuated using control logic executed by the controller.

Pickup trucks are a versatile vehicle that may be used for various types of work both commercially and around the home. For example, pickup trucks are frequently used to carry dirt, mulch, stone, or other material in the bed. In some instances, it may be desirable for the user of the pickup truck to unload cargo from the bed, such as dirt, and place it on the ground at frequent intervals. In a vehicle with only traditional controls, this would require either two people (one to drive and one to unload) or would require a single person to get in and out of the vehicle frequently. Having to get in and out of the vehicle to drive short distances repeatedly adds time to the project and has the potential to bring unwanted dirt into the passenger cabin. An ideal added control for these types of scenarios would enable the user to drive the vehicle from outside the vehicle. For example, a human machine interface (HMI) may be provided near the rear of the vehicle and allow the user to drive the vehicle forward a short distance at low speed thus eliminating the need for getting into, and out of, the vehicle every time it needs to be moved to the next location, which may be mere feet away. The HMI may allow the user to drive the vehicle both forward and in reverse.

Figure 2:
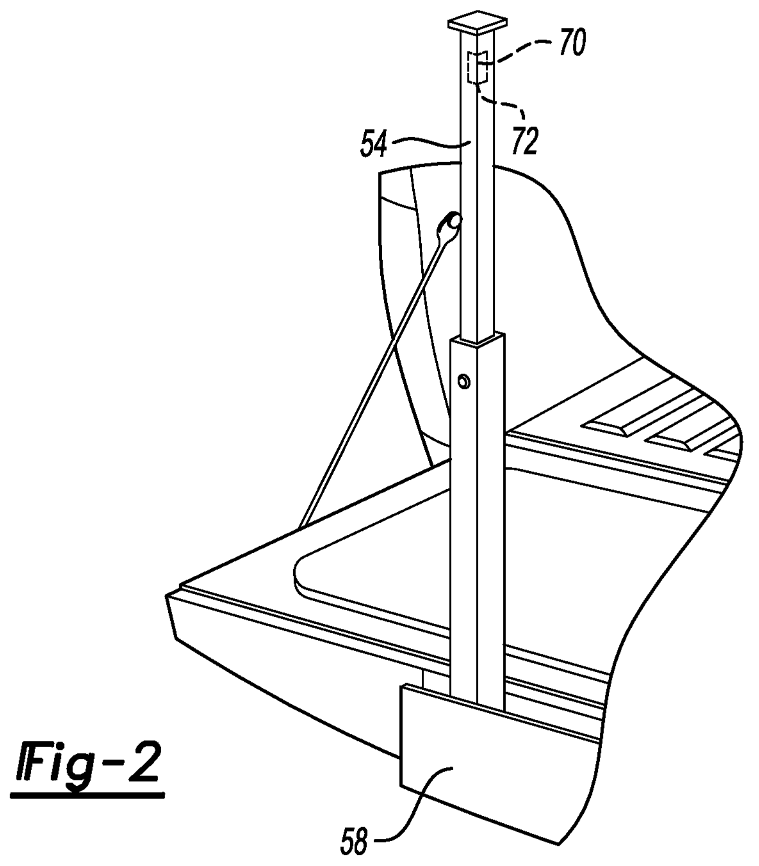
FIG. 2 is a perspective view of a tailgate grab handle having an HMI for controlling propulsion of the vehicle by a user that is standing by the tailgate.

Referring to FIGS. 1 and 2, in one embodiment, and HMI 70 for externally propelling the vehicle is provided on the step handle 54. In one embodiment, the HMI 70 includes a force or pressure sensor 72 that is mounted to the step handle and configured to sense a force or pressure exerted on the step handle 54 by the user. As shown in FIG. 1, the user is pressing forward on the step handle 54 which is being registered by the force or pressure sensor 72 of the HMI 70. This allows the user to "push" the vehicle forward by a desired distance. Placing the HMI 70 on the handle 54 is but one embodiment; the HMI 70 may be placed at any location on the exterior of the vehicle. Other placements include on a vehicle body panel, on the bumper, on the tailgate, and the like. The HMI 70 may be any switch or sensor that is operable to sense an input from the user and output a signal to the vehicle controller 46. Examples include a pressure sensor, a force sensor, a button, a switch, toggle, or a touchscreen display. The HMI 70 may be one of a plurality of HMIs located at various external locations of the vehicle. For example, the vehicle may include a front HMI for propelling the vehicle while standing in front of the vehicle and a rear HMI for propelling the vehicle while standing behind the vehicle. The vehicle may also include HMI is located on the sides or quarter panels of the vehicle. An HMI fob or remote (including a phone application) may also be used to control vehicle movement for outside the cabin 14.

In one or more examples, the HMI includes an actuatable member configured to receive user input and a sensor configured to sense a displacement of the actuatable member and output a signal indicative of the displacement. Referring to the example of FIG. 2, the pole of the step handle 54 may be movable and a sensor is configured to measure the movement of the pole. The sensor may be configured to output a signal indicative of the displacement of the pole.

In some embodiments, an HMI 70 may be a separate component that is not permanently affixed to the vehicle 10. For example, an HMI assembly may be provided. The separate HMI assembly may be configured to attach to the vehicle in a releasable manner, e.g., clamps, suction, hook-and-loop fasteners, e.g., VELCRO®, connectors, or the like. The separate HMI assembly may include an HMI and a support structure that connects the HMI to the vehicle 10. The HMI assembly may include a cable configured to connect the HMI to the vehicle or may be wireless. The electronics of the HMI assembly are programmed to communicate with the vehicle controller. The vehicle may include one or more ports for receiving the cable. The ports may be located on external portions of the vehicle 10 designed to receive the separate HMI. The vehicle 10 may include multiple connection points for the separate HMI so that the user may place the HMI at the desired location, e.g., the front or the rear depending on the activity taking place This driving mode may be referred to as "external driving mode." The vehicle may require the user to select the external driving mode before enabling the HMI 70 for propelling the vehicle forward or in reverse. The user may enable the external driving mode using another HMI provided within the passenger cabin 14, such as the touchscreen of the head unit. Once the user selects the external driving mode, the HMI 70 located on the outside of the vehicle becomes active so that the user may now propel the vehicle externally.

Figure 3:
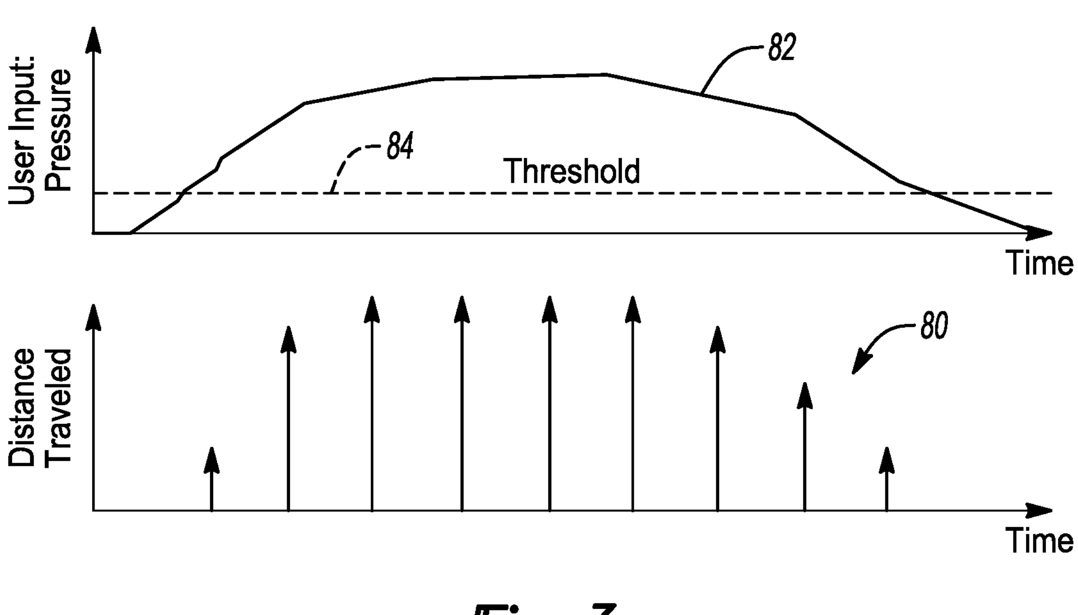
FIG. 3 is a plot showing a sequence of discrete vehicle movements of constant frequency and variable distance based on a pressure applied to an HMI.

Referring to FIG. 3, in one implementation, the vehicle motion is controlled similarly to a stepper motor. In other words, for every "push/touch" on the interface, e.g., HMI 70, the vehicle is moved forward by a predefined amount 80. (This slow movement of the vehicle commanded from outside of the passenger cabin may be referred to as a nudge.) Different strategies to implement this are contemplated. For example, as the user input, e.g., a measure pressure or force 82 from a sensor 72 of the HMI 70, exceeds a threshold pressure or force 84, respectively, the controller will command propulsion torque to powerplant and braking torque to the friction brakes to move vehicle in steps of distance 80, which are proportional to the user input pressure/force at a fixed time interval rate (as shown). Alternatively, all steps might be constant and independent of user input pressure (not shown). That is, the vehicle will move farther forward when the user exerts more force/pressure on the HMI 70 and will move a lesser distance when the user exerts less force/pressure on the HMI 70.

Figure 4:
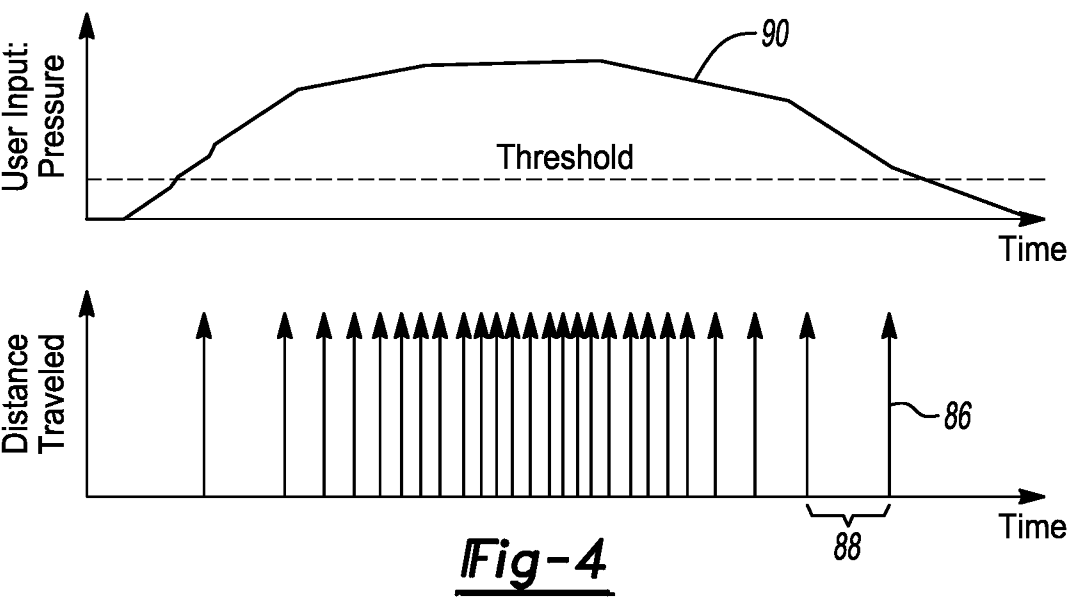
FIG. 4 is a plot showing a sequence of discrete vehicle movements of constant distance and variable frequency based on a pressure applied to an HMI

Referring to FIG. 4, in another implementation, as the user input is actuated, the controller will apply controlled propulsion torque/braking torque to move vehicle in steps of constant length 86 but with a frequency 88 between movement pulses that is proportional to user input pressure or force 90, which may be measured by a pressure or force sensor 72 of the HMI 70. Here, the vehicle motion step 86 may be a predefined distance or a predefined torque profile.

Figure 5:
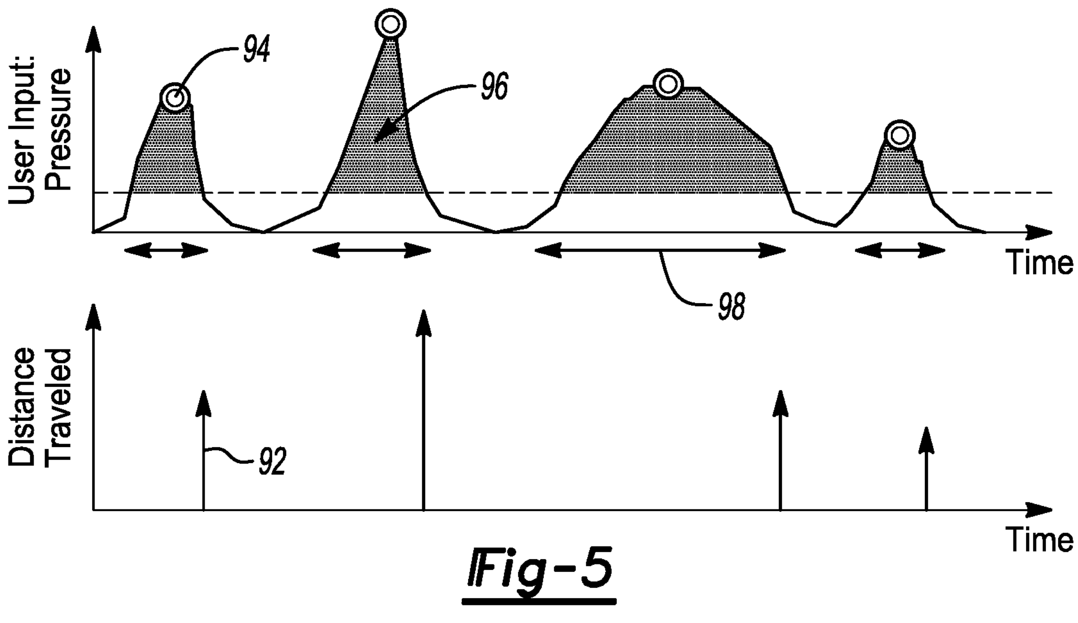
FIG. 5 is a plot showing vehicle movement based on a total amount of using input applied to the HMI.

Referring to FIG. 5, in yet another implementation, the user is required to apply discrete force pulses on the HMI 70. The discrete movement of the vehicle is only applied after a pulse is detected and the pressure level decreases below the threshold, i.e., press and release. The controller analyzes the press to determine the distance to propel the vehicle, i.e., the distance traveled is proportion to the press force and duration. FIG. 6 illustrates three examples for description purposes. In the first example, the distance traveled 92 (or the torque commanded) is proportional to peak pressure (circles 94) of the press. In a second example, the distance traveled 92 (or the torque commanded) is proportional to energy exchanged (shaded areas 96 under the curve). This may be calculated by integration of the pressure curve. In a third example, the distance traveled 92 (or the torque commanded) is proportional to the pulse duration 98. In each of these examples, the distance travel increases as the sensed parameter, e.g., peak pressure, increases. In another embodiment, the distance of travel applied with each pulse could be a constant predetermined value.

The system may include a dead-man switch to prevent inadvertent actuation of the HMI 70. The dead-man switch may be provided on an exterior of the vehicle, such as a body panel. The dead-man switch may be a force or pressure sensor or a button. Additionally, the controls may set minimum and maximum durations of the pulses to eliminate spurious effect due to noise or distracted operators. Additionally, a prolonged "ON" pressure detected on the HMI 70, could permanently disable the nudging service until the operator resets the system.

FIG. 6 illustrates an example close-loop controller 100, such as a PID controller. In this example, one or more controllers of the control system determines a target position based on input at the HMI 70 as discussed above. The target position may be equal to the vehicle position at the time of actuation of the HMI 70 plus the desired travel distance. (As discussed above, the desired travel distance may be a predefined constant or may be based on the force or pressure of the input, the duration of the input, or the number of discrete inputs into the HMI 70.) At summation box 102, the controller determines the difference or error 104 between the current position and the target position. (The current position may be determined using the vehicle GPS, the odometer, or other method.) The PID control box 106 determines an appropriate net torque command 108, which may include propulsion torque command for the powertrain and braking torque commands for the friction brakes, to reduce the error 104. The vehicle then determines the current position for comparison to the target position.

FIG. 7 illustrates an example close-loop controller 120, such as a PID controller. In this example, one or more controllers of the control system determines a target vehicle speed based on input at the HMI 70. (As discussed above, the target speed may be a predefined constant or may be based on the force or pressure of the input, the duration of the input, or the number of discrete inputs into the HMI 70, etc.) At summation box 122, the controller determines the difference or error 124 between the current, measured speed of the vehicle and the target speed. The PID control box 126 determines an appropriate net torque command 128, which may include propulsion torque commands for the powertrain and braking torque commands for the friction brakes, to reduce the error 124. The vehicle then measures the vehicle speed, using a speed sensor such as a wheel speed sensor or a sensor located in the transmission, for comparison to the target speed.

Control logic or functions performed by controller 46 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle, engine, and/or powertrain controller, such as controller 46. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller may be in electric communication with an HMI is provided on an external portion of the vehicle such as a body panel, tailgate, stepped handle, etc. The HMI is configured to receive input from user located outside of the passenger compartment output a signal to the controller when the HMI receives input. The controller may be programmed to, in response to the signal being received, command a torque to the powerplant, e.g., an engine or an electric machine) to propel the vehicle based on the signal. The controller may be further programmed to command a braking torque to the friction brakes in response to the signal being received. The controller may also be programmed to discontinue the torque to the powerplant in response the signal no longer being received.

In one or more embodiments, the target position is based on a current position of the vehicle plus an incremental travel distance. The incremental travel distance may be based on a duration of the input such that the incremental travel distance increases as the duration increases. The incremental travel distance may be based on force/pressure of the input such that the incremental travel distance increases as the force/pressure increases. The incremental travel distance may also be based on an energy applied to the input such that the incremental travel distance increases as the energy increases.

The torque to the powerplant may be based on an error between a target speed of the vehicle and a measured speed of the vehicle. The torque commanded to the powerplant may be based on an error between a target position of the vehicle and a measured position of the vehicle in other embodiments.

The controller may be configured to discontinue or not initiate the external driving mode when a dead man switch is deactivated. That is, the controller only commands torque to the powertrain to propel the vehicle based on the signal at the HMI when the dead man switch is activated.

In another example, the controller is in electric communication with a pressure sensor located externally to the passenger compartment and allowing a user to control vehicle movement from outside of the vehicle. The pressure sensor may be configured to measure a pressure input by the user at the HMI and output a measured pressure to the controller. The controller may be programmed to, when the measure pressure exceeds a threshold, command a torque to the powerplant to propel the vehicle according to the measure pressure. The torque may be commanded such that the vehicle moves forward a predetermined distance, wherein the predetermined distance may be based on the measured pressure such that the distance increases as the measured pressure increases.

The torque may be commanded in discrete intervals and a frequency of the intervals may be based on the measure pressure, wherein the torque is commanded such that the vehicle moves forward at a predetermined speed.

In yet another example, the controller is configured to receive a propulsion request from a HMI located on an exterior of the vehicle. In response to the propulsion request being received, the controller commands a torque to a powerplant of the vehicle such that the vehicle is propelled according to commands from a person who is located outside of the vehicle.

FIG. 8 is a flowchart 200 of an algorithm for controlling the vehicle during the external driving mode. The controller 200 may be implemented in response to the external driving mode being activated by user. At operation 202, an input from the user is received at the external HMI. In response, the HMI may send a signal to the controller indicative of the received input, such as a measured force or pressure as discussed above. The controller receives the signal and analyzes the received input to determine the pressure or force exerted by the user at operation 204. Controller then determines the desired distance or frequency to propel the vehicle forward or in reverse as discussed above with regards to FIGS. 4, 5 and 6. At operation 206, the controller commands braking and propulsion torques to propel the vehicle based on the received input. Example controls for operation 206 are illustrated in FIGS. 6 and 7. However, as discussed above, these are merely two example implementations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:

a body defining a passenger cabin and a box and having a tailgate mounted to the box;

a step assembly associated with the box and including a step and a handle, wherein the handle includes a sensor configured to receive input from a user located outside of the passenger cabin and output a signal when the input is active, wherein the sensor is a pressure or force sensor located externally to the passenger compartment allowing a user to control vehicle movement from outside of the vehicle, the sensor being configured to measure an input by the user and output a measured pressure or force signal;

a powerplant; and a controller programmed to, in response to the signal being received, command a torque to the powerplant to propel the vehicle according to the signal such that the vehicle moves forward a predetermined distance that is based on the measured pressure or force, wherein the predetermined distance increases as the measured pressure or force increases, and the torque is commanded in discrete intervals and a frequency of the intervals is based on the measured pressure or force.

2. The vehicle of claim 1 further comprising friction brakes, wherein the controller is further programmed to command a braking torque to the friction brakes in response to the signal being received.

3. The vehicle of claim 1, wherein the controller is further programmed to discontinue the torque to the powerplant in response the signal no longer being received.

4. The vehicle of claim 1, wherein the torque to the powerplant is based on an error between a target speed of the vehicle and a measured speed of the vehicle.

5. The vehicle of claim 1, wherein the sensor is configured to sense a force or pressure of the input and the signal is indicative of the force or pressure, wherein the torque commanded to the powerplant is based on a magnitude of the signal.

6. The vehicle of claim 1, wherein the handle includes a movable portion, and the sensor is configured to sense displacement of the movable portion.

7. The vehicle of claim 1, wherein the torque commanded to the powerplant is based on an error between a target position of the vehicle and a measured position of the vehicle.

8. The vehicle of claim 7, wherein the target position is based on a current position of the vehicle plus an incremental travel.

9. The vehicle of claim 8, wherein the incremental travel is based on a duration of the input such that the incremental travel increases as the duration increases.

10. The vehicle of claim 8, wherein the incremental travel is based on force of the input such that the incremental travel increases as the force increases.

11. The vehicle of claim 8, wherein the incremental travel is based on an energy applied to the input such that the incremental travel increases as the energy increases.

12. The vehicle of claim 1, wherein the torque is only commanded to the powerplant to propel the vehicle based on the signal when a dead-man switch is activated.

13. A vehicle comprising:

a body defining a passenger cabin and a box and having a tailgate mounted to the box;

a step assembly associated with the box and including a step and a handle, wherein the handle includes a sensor configured to receive input from a user located outside of the passenger cabin and output a signal when the input is active, wherein the sensor is a pressure or force sensor located externally to the passenger compartment allowing a user to control vehicle movement from outside of the vehicle, the sensor being configured to measure an input by the user and output a measured pressure or force signal;

a powerplant; and a controller programmed to, when the signal exceeds a threshold, command a torque to the powerplant to propel the vehicle according to the signal such that the vehicle moves forward a predetermined distance that is based on the measured pressure or force, wherein the predetermined distance increases as the measured pressure or force increases, and the torque is commanded in discrete intervals and a frequency of the intervals is based on the measured pressure or force.

14. The vehicle of claim 13, wherein the torque is commanded such that the vehicle moves forward at a predetermined speed.

* * * * *